United States Patent
Kida

(10) Patent No.: US 7,219,393 B2
(45) Date of Patent: May 22, 2007

(54) HINGE SYSTEM USED FOR PERSONAL COMPUTER AND PERSONAL COMPUTER INCLUDING THE SAME

(76) Inventor: Makoto Kida, Nishihikarigaoka-Danchi 17-12-404, Kamishirane-cho, Asahi-ku, Yokohama, Kanagawa (JP) 891

(*) Notice: Subject to any disclaimer, the term of this patent is extended or adjusted under 35 U.S.C. 154(b) by 263 days.

(21) Appl. No.: 10/937,888

(22) Filed: Sep. 10, 2004

(65) Prior Publication Data

US 2005/0117284 A1   Jun. 2, 2005

(30) Foreign Application Priority Data

Sep. 12, 2003 (JP) ............................. 2003-361231
Sep. 3, 2004 (JP) ............................. 2004-256907

(51) Int. Cl.
*E05D 11/10* (2006.01)

(52) U.S. Cl. ............................. 16/221; 16/303; 16/330; 16/340; 16/342

(58) Field of Classification Search ................. 16/303, 16/319, 327–332, 337, 341, 342, 221, 340; 361/680–682; 248/917–921; 379/433.13
See application file for complete search history.

(56) References Cited

U.S. PATENT DOCUMENTS

| | | | | |
|---|---|---|---|---|
| 4,829,633 A | * | 5/1989 | Kassner | 16/322 |
| 5,178,481 A | * | 1/1993 | Kawamura | 403/92 |
| 5,970,819 A | * | 10/1999 | Katoh | 74/531 |
| 5,996,132 A | * | 12/1999 | Sorimachi | 4/236 |
| 6,038,739 A | * | 3/2000 | Katoh | 16/342 |
| 6,070,298 A | * | 6/2000 | Sorimachi | 16/330 |
| 6,421,878 B1 | * | 7/2002 | Kaneko et al. | 16/330 |
| 6,658,699 B2 | * | 12/2003 | Huong | 16/330 |
| 6,757,940 B2 | * | 7/2004 | Lu et al. | 16/330 |

FOREIGN PATENT DOCUMENTS

JP   2004-003594 A   1/2004

* cited by examiner

*Primary Examiner*—Robert J. Sandy
*Assistant Examiner*—Michael J. Kyle
(74) *Attorney, Agent, or Firm*—Griffin & Szipl, P.C.

(57) ABSTRACT

A hinge supporting first and second portions such that they are open and closed relative to each other, including a rotation shaft fixed to the second portion and supported by the first portion so as to be rotatable around a rotation axis thereof relative to the first portion, first and second parts into which the rotation shaft is inserted, and an energizer for pushing the movable part towards the fixed part. The first part is fixed to the first portion so as to be rotatable around the rotation axis relative to the first part. The second part is axially movable relative to the rotation shaft and not rotatable around a rotation axis thereof, and rotates together with the rotation shaft. Each of the first and second parts has a projection projecting towards each other. The projections overlap each other axially of the rotation shaft when the first and second portions are open each other at a certain angle in the range of predetermined angles.

19 Claims, 7 Drawing Sheets

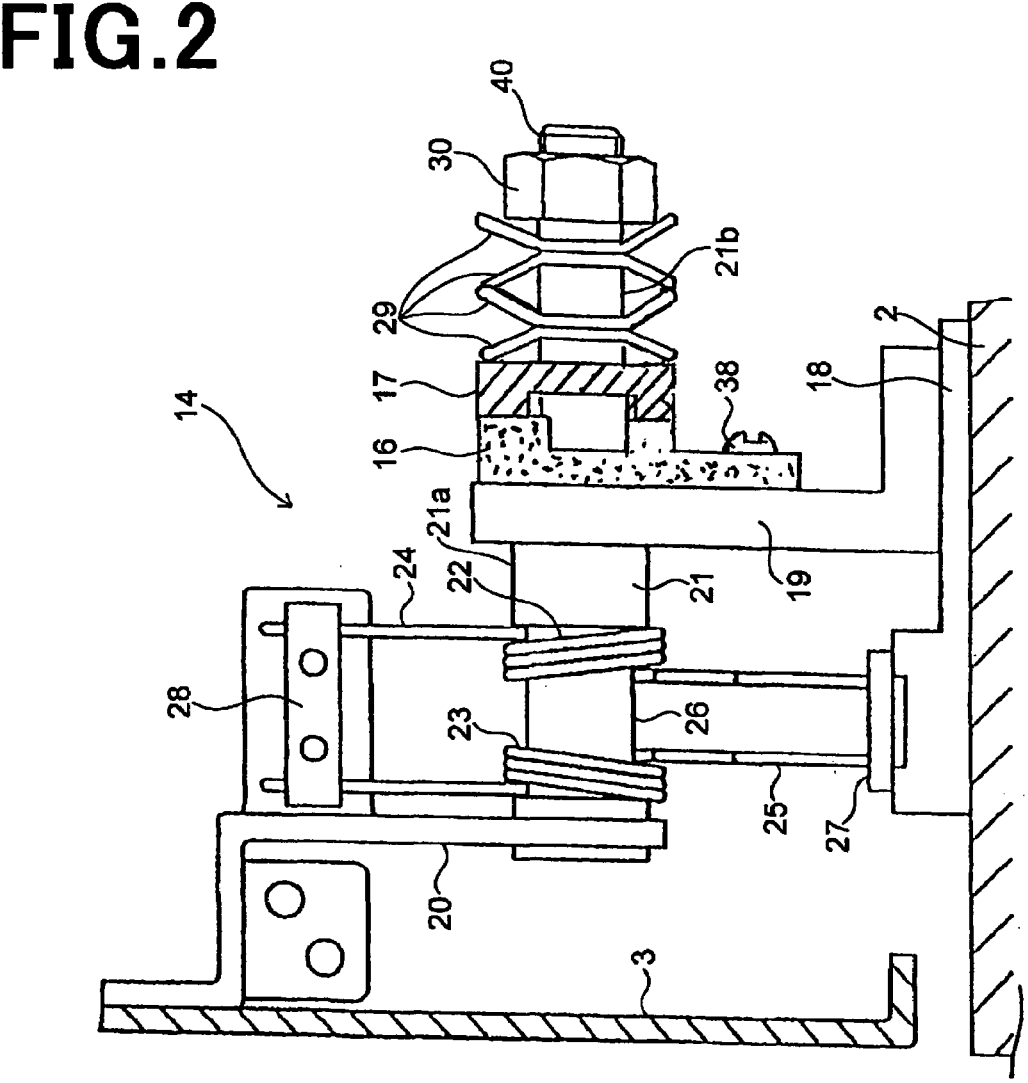

HINGE SYSTEM USED FOR PERSONAL COMPUTER AND PERSONAL COMPUTER INCLUDING THE SAME

This application claims priority from Japanese Patent Application No. 2003-361231, filed Sep. 12, 2003 and Japanese Patent Application No. 2004-256907, filed Sep. 3, 2004, the entire disclosures of which are incorporated herein by reference.

BACKGROUND OF THE INVENTION

1. Field of the Invention

The present invention relates a hinge and an open-cover type personal computer including the same.

2. Description of the Related Art

A note-type personal computer is usually designed to have a mechanism which makes it possible to lift an upper cover up from a main body with small force, and keep the upper cover open at a certain angle relative to the main body.

FIG. 7 is a perspective view illustrating a conventional note-type personal computer 100 suggested in Japanese Patent Application Publication No. 2004-3594.

As illustrated in FIG. 7, an upper cover 101 into which a liquid crystal display unit is incorporated is supported at opposite ends thereof relative to a main body 102 such that the upper cover 101 can open and close relative to the main body 102.

One of supporters 103 is comprised of a resistive hinge 104 so as to produce a force for stopping rotation of the upper cover 101.

The other supporter 105 is comprised of a torsion coil spring 106. The torsion coil spring 106 makes it possible to open the upper cover 101 with small force, and acts as a dumper when the upper cover 101 is closed relative to the main body 102.

In the conventional note-type personal computer 100, a force for stopping rotation of the upper cover 101 is dependent on a weight of the upper cover 101. For instance, if the upper cover 101 is 850 grams in weight, there are used the resistive hinge 104 having a resistance of about 6 kgf/cm, and two torsion coil springs 106 compensating for gravitational force of the upper cover 101 to fall down, in order to prevent the upper cover 101 from falling down due to its own weight and keep the upper cover 101 open at a predetermined angle (generally, in the range of 80 to 160 degrees) at which a viewer can see the upper cover 101 most clearly. However, the conventional note-type personal computer 100 is accompanied with a problem that since gravitational force of the upper cover 101 of about 5.8 kgf/cm at maximum is added to the resistance of resistive hinge 104 of 6 kgf/cm, a force for stopping rotation of the upper cover 101 is reduced when the upper cover 101 is open at 150 degrees or greater, and resultingly, the upper cover 101 falls down due to its own weight, and that if the resistive hinge 104 is designed to have a greater resistance, the upper cover 101 would not fall down due to its own weight, but it would be necessary to apply a greater force to the upper cover 101 for opening the same.

SUMMARY OF THE INVENTION

In view of the above-mentioned problem in the hinge used in the conventional note-type personal computer, it is an object of the present invention to provide a hinge supporting a first portion (for instance, a main body of a note-type personal computer) and a second portion (for instance, an upper cover having a liquid crystal display unit) therewith such that they can open and close relative to each other, which makes it possible to open and close the first and second portions with small force, to smoothly open and close the first and second portions with small force even for children, aged persons or handicapped persons, to keep an upper cover open at an angle (generally, in the range of about 90 to about 145 degrees measured after an upper cover starts opening) at which a user can clearly see a screen of a liquid crystal display unit, and to prevent an upper cover from falling down due to its own weight even at an angle in the range of 150 to 160 degrees (preferably, 150 to 180 degrees or greater). It is also an object of the present invention to provide an open-cover type personal computer including such a hinge.

Hereinbelow is described the hinge in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a hinge (14, 15) supporting a first portion (2) and a second portion (3) such that they are open and closed relative to each other, including a rotation shaft (21) fixed to the second portion (3) and supported by the first portion (2) such that the rotation shaft (21) is rotatable around a rotation axis thereof relative to the first portion (2), a first part (16, 50) into which the rotation shaft (21) is inserted, a second part (17, 70) into which the rotation shaft (21) is inserted, and an energizer (29, 30, 40), wherein one of the first and second parts defines a fixed part (16, 50) fixed to the first portion (2) such that the rotation shaft (21) is rotatable around the rotation axis relative to the fixed part (16, 50), the other of the first and second parts defines a movable part (17, 70) which is axially movable relative to the rotation shaft (21) and not rotatable around a rotation axis thereof relative to the rotation shaft (21), and which rotates together with the rotation shaft (21) when the rotation shaft (21) rotates around the rotation axis thereof relative to the first portion (2), the first part (16, 50) has a projection (43, 47, 32, 33) projecting towards the second part (17, 70), and the second part (17, 70) has a projection (54, 64, 71, 72) projecting towards the first part (16, 50), the projections (43, 47, 32, 33; 54, 64, 71, 72) overlapping each other axially of the rotation shaft (21) when the first and second portions (2, 3) are open each other at a certain angle in the range of predetermined angles, the energizer (29, 30, 40) energizes the movable part (17, 70) towards the fixed part (16, 50), and when the first and second portions (2, 3) are open each other at a certain angle in the range of the predetermined angles, the first and second portions (2, 3) are kept open at the certain angle by virtue of frictional force generated between the projection of the fixed part (16, 50) and the projection of the movable part (17, 70).

For instance, the energizer (29, 30, 40) is comprised of a resilient unit (29) making contact with a surface of the movable part (17, 70) located oppositely to the fixed part (16, 50), and a restrictor (30, 40) restricting the resilient unit (29) to be compressed by the movable part (17, 70) to move far away from the fixed part (16, 50).

For instance, the resilient unit (29) is comprised of a Belleville spring (29) into which the rotation shaft (21) is inserted between the restrictor (30, 40) and the movable part (17, 70).

For instance, the first part (16, 50) is formed at a surface thereof facing the second part (17, 70) with a lower-level portion (41, 45, 52, 62) lower than the projection (43, 47, 55, 65) of the first part (16, 50), an upwardly-inclining portion (42, 46, 53, 63) upwardly inclining from the lower-level portion (41, 45, 52, 62) to the projection (43, 47, 55, 65) of the first part (16, 50), and the projection (43, 47, 55, 65) of the first part (16, 50), arranged in this order circumferentially of a rotation axis of the rotation shaft (21).

It is preferable that each of the first and second parts (16, 50, 17, 70) has two projections (43, 47, 54, 64, 32, 33, 71, 72) arranged circumferentially of a rotation axis of the rotation shaft (21) and spaced away from each other, and one of the two projections of the first part (16, 50) makes contact with one of the two projections of the second part (17, 70), and the other of the two projections of the first part (16, 50) makes contact with the other of the two projections of the second part (17, 70) to provide frictional force for keeping the first and second portions (2, 3) open at the certain angle.

For instance, the first part (16, 50) is formed at a surface thereof facing the second part (17, 70) with a first lower-level portion (41, 52) lower than a first projection (43, 54) which is one of two projections of the first part, a first upwardly-inclining portion (42, 53) upwardly inclining from the first lower-level portion (41, 52) to the first projection, the first projection (43, 54), a first downwardly-inclining or downwardly-stepped portion (44, 57) lowering from the first projection (43, 54), a second lower-level portion (45, 62) lower than a second projection (47, 64) which is the other of two projections of the second part, a second upwardly-inclining portion (46, 63) upwardly inclining from the second lower-level portion to the second projection, the second projection (47, 64), and a second downwardly-inclining or downwardly-stepped portion (48, 67) lowering from the second projection, all arranged in this order circumferentially of a rotation axis of the rotation shaft (21).

It is preferable that the projection (43, 54) of the first part (16, 50) and the projection (47, 64) of the second part (17, 70) are equal in height to each other.

It is preferable that the first lower-level portion (41, 52) and the second lower-level portion (45, 62) are equal in height to each other.

There is further provided a hinge (14, 15) supporting a first portion (2) and a second portion (3) such that they are open and closed relative to each other, including a rotation shaft (21) fixed to the second portion (3) and supported by the first portion (2) such that the rotation shaft (21) is rotatable around a rotation axis thereof relative to the first portion (2), a first part (50) into which the rotation shaft (21) is inserted, a second part (70) into which the rotation shaft (21) is inserted, and an energizer (29, 30, 40), wherein one of the first and second parts defines a fixed part (50) fixed to the first portion (2) such that the rotation shaft (21) is rotatable around the rotation axis relative to the fixed part (50), the other of the first and second parts defines a movable part (70) which is axially movable relative to the rotation shaft (21) and not rotatable around a rotation axis thereof relative to the rotation shaft (21), and which rotates together with the rotation shaft (21) when the rotation shaft (21) rotates around the rotation axis thereof relative to the first portion (2), the first part (50) has two projections (54, 64) projecting towards the second part (70), and arranged circumferentially of a rotation axis of the rotation shaft (21) and spaced away from each other, the second part (70) has two projections (71, 72) projecting towards the first part (50), arranged circumferentially of a rotation axis of the rotation shaft (21) and spaced away from each other, the projections (54, 64) of the first part (50) and the projections (71, 72) of the second part (70) overlap each other axially of the rotation shaft (21) when the first and second portions (2, 3) are open each other at a certain angle in the range of predetermined angles, the energizer (29, 30, 40) energizes the movable part (70) towards the fixed part (50), and when the first and second portions (2, 3) are open each other at a certain angle in the range of the predetermined angles, the first and second portions (2, 3) are kept open at the certain angle by virtue of frictional force generated between the projection of the fixed part (50) and the projection of the movable part (70), one of the two projections (54, 64) of the first part (50) makes contact with one of the two projections (71, 72) of the second part (70), and the other of the two projections (54, 64) of the first part (50) makes contact with the other of the two projections (71, 72) of the second part (70) to provide frictional force for keeping the first and second portions (2, 3) open at the certain angle, one of the two projections of the second part (70) is comprised of an inner projection (72) located inwardly around a rotation axis of the rotation shaft (21), and the other is comprised of an outer projection (71) located outwardly around the rotation axis of the rotation shaft (21).

It is preferable that a first region in which the inner projection (72) of the second part (70) can move keeping contact with a surface of the first part (50) facing the second part (70) extends in 180 degrees or greater, and a second region in which the outer projection (71) of the second part (70) can move keeping contact with a surface of the first part (50) facing the second part (70) extends in 180 degrees or greater, the first and second regions partially overlapping each other.

It is preferable that an area which is located inwardly around a rotation axis of the rotation shaft (21) and in which the inner projection (72) can move keeping contact therewith extends in a greater angle than an angle in which an area which is located outwardly around the rotation axis of the rotation shaft (21) extends, in a projection (64) corresponding to the inner projection (72) among the two projections (54, 64) of the first part (50), and an area which is located outwardly around a rotation axis of the rotation shaft (21) and in which the outer projection (71) can move keeping contact therewith extends in a greater angle than an angle in which an area which is located inwardly around the rotation axis of the rotation shaft (21) extends, in a projection (54) corresponding to the outer projection (71) among the two projections (54, 64) of the first part (50).

In another aspect of the present invention, there is provided a personal computer including a main body, an upper cover including a display, and one of the above-mentioned hinges (14, 15) supporting the main body and the upper cover such that they are open and closed relative to each other.

The advantages obtained by the aforementioned present invention will be described hereinbelow.

In accordance with the present invention, when the first portion (for instance, a main body of a note-type personal computer) and the second portion (for instance, an upper cover having a liquid crystal display unit therein) are made open relative to each other at a certain angle in the range of predetermined angles, the projection of the fixed part and the projection of the movable part overlap each other axially of the rotation shaft. As a result that the movable part is pushed by the fixed part to move away from the fixed part, and the energizer further compresses the movable part, a frictional force between the projection of the fixed part and the projection of the movable part is increased. The thus increased frictional force keeps the first and second portions open at the certain angle.

The projection of the fixed part and the projection of the movable part do not overlap each other axially of the rotation shaft when an angle formed between the first and second portions is between zero (the first and second portions are closed each other) and the above-mentioned range of predetermined angles. Hence, frictional force between the fixed and movable parts is relatively small, and thus, a user can open and close the first and second portions each other with small force. Thus, even children, aged persons and handicapped persons can smoothly open and close the first and second portions each other with small force.

In addition, by appropriately setting the range of predetermined angles, it is possible to keep an upper cover having a liquid crystal display unit therein open at an angle (generally, in the range of about 90 to about 145 degrees measured after an upper cover starts opening) at which a user can readily see a screen of the liquid crystal display unit, for instance, in a note-type personal computer. Furthermore, it is possible to prevent an upper cover from falling down due to its own weight even at an angle in the range of 150 to 160 degrees (preferably, 150 to 180 degrees or greater) measured after the upper cover starts opening.

In accordance with Japanese Patent Application Publication No. 2004-3594, since the resistive hinge has a resistive force which is constant independently of an angle formed between an upper cover and a main body, if the resistive force to be generated when an upper cover starts opening is reduced, the upper cover would fall down due to its own weight at 150 to 160 degrees. In contrast, the hinge in accordance with the present invention can reduce a resistive force thereof when an upper cover starts opening, and can increase a resistive force thereof only in the range of angles at which a user wants to stop the upper cover, and thus, a user is surely able to stop the upper cover at his/her desired angle. It is possible to prevent an upper cover from falling down due to its own weight even at an angle in the range of 150 to 160 degrees (preferably, 150 to 180 degrees or greater) measured after the upper cover starts opening.

In the present invention, a range of angles in which the first and second portions are open or closed each other with a resistive force can be varied in dependence on a location of the projections of the fixed and movable parts, and an angle in which the projections extend.

Furthermore, a resistive force with which the first and second portions are open and closed each other can be varied in dependence on a height of the projections of the fixed and movable parts.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 2 is an enlarged front view illustrating one of a pair of supporters (hinges) and parts arranged therearound in the note-type personal computer illustrated in FIG. 1.

DESCRIPTION OF THE PREFERRED EMBODIMENTS

Preferred embodiments in accordance with the present invention will be explained hereinbelow with reference to drawings.

First Embodiment

Figure 1:
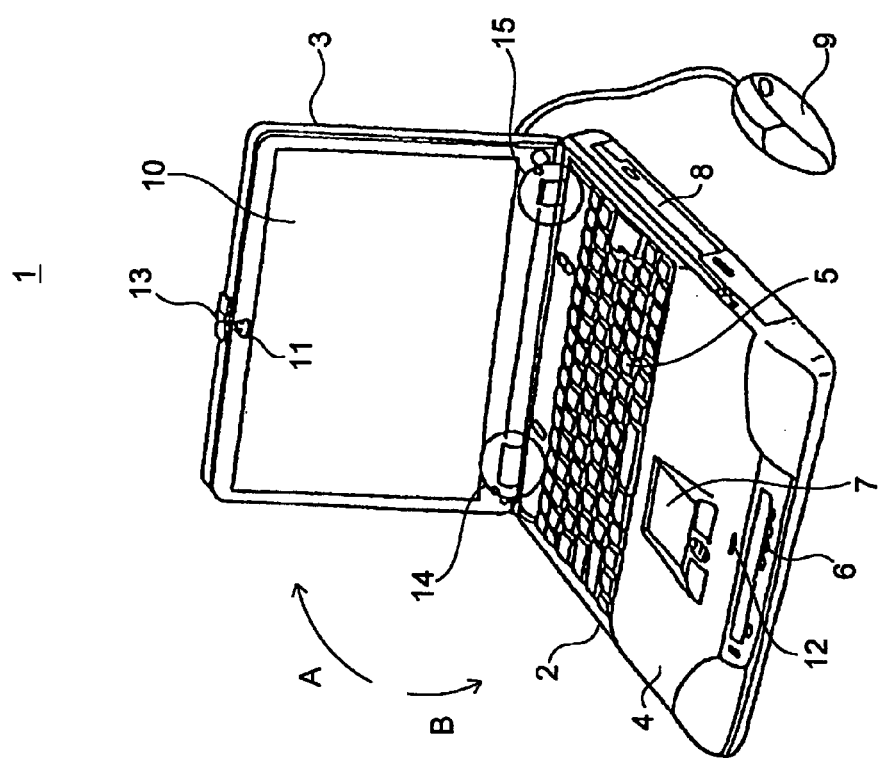
FIG. 1 is a perspective view of a note-type personal computer in accordance with an embodiment of the present invention.

FIG. 1 is a perspective view illustrating a note-type (open-cover type) personal computer 1 in accordance with the first embodiment.

As illustrated in FIG. 1, the note-type personal computer 1 is comprised of a thin box-shaped main body (first portion) 2, and an upper cover (second portion) 3 supported at an upper edge at the rear of the main body 2 such that the upper cover 3 can open and close relative to the main body 2. As mentioned later, the upper cover 3 is designed to be able to be kept open relative to the main body 2 at a certain angle in the range of predetermined angles.

The main body 2 has an upper surface 4 located inwardly when the upper cover 3 is closed to the main body 2. On the upper surface 4 are arranged a keyboard 5, various operation buttons 6, and a track pad 7. On a side of the main body 2 are arranged a CD-ROM drive 8, a FD drive (not illustrated), and various terminals (not illustrated).

A mouse 9 is connected to the main body 2 at a certain terminal through a code.

The upper cover 3 includes a display unit comprised of a liquid crystal display device, for instance, and a display screen 10 of the display unit is arranged on a surface located inwardly when the upper cover 3 is closed to the main body 2.

Accordingly, when the upper cover 3 is open relative to the main body 2, a user can operate the keyboard 5 or the mouse 9, looking at the display screen 10, and when the upper cover 3 is closed to the main body 2, the upper surface 4 of the main body 2 is covered with the upper cover 3, thereby being suitable for preservation and carriage.

In the first embodiment, the upper cover 3 is designed to be able to open relative to the main body 2 at about 165 degrees at maximum, for instance. For instance, when the upper cover 3 is open relative to the main body 2 at about 165 degrees, a rear of the upper cover 3 makes contact with a rear edge of the main body 2, resulting in that the upper cover 3 cannot further open.

The upper cover 3 includes a rock crawl 11 at a distal end thereof, and the main body 2 has a receiver 12 to which the rock crawl 11 is engaged, at a front of the upper surface 4 of the main body 2. When the upper cover 3 is closed to the main body 2, the receiver 12 is automatically engaged to the rock crawl 11, resulting in that the upper cover 3 is kept closed relative to the main body 2.

A rock-reliever 13 for releasing engagement of the rock crawl 11 with the receiver 12 is arranged at a distal end of the upper cover 3, for instance.

The rock-reliever 13 is designed to be slidable. By sliding the rock-reliever 13 in a direction, the engagement of the rock crawl 11 with the receiver 12 is released, resulting in that the upper cover 3 now can open relative to the main body 2.

The rock-reliever 13 is pushed in a direction opposite to a direction in which the rock-reliever 13 slides. Hence, when the rock-reliever 13 is released from being slid, the rock-reliever 13 automatically returns to an initial location.

The upper cover 3 is supported by the main body 2 through a pair of supporters (hinges) 14, 15 such that the upper cover 3 can open relative to the main body 2 in a direction indicated with an arrow A in FIG. 1, and close relative to the main body 2 in a direction indicated with an arrow B in FIG. 1.

In the first embodiment, the supporters 14, 15 are designed to have the same structure as each other. For instance, they are symmetric with each other in structure. Hence, hereinbelow is explained only one of them, for instance, the supporter 14 (at the left in FIG. 1).

FIG. 2 is an enlarged front view illustrating an internal structure of the supporter 14 and parts arranged therearound.

As explained in detail later, the supporter 14 is comprised of a fixed washer (a fixed part or a first part, for instance) 16, and a movable washer (a movable part or a second part, for instance) 17 making contact at a surface thereof with the fixed washer 16, and designed rotatable around a rotation axis thereof relative to the fixed washer 16. The upper cover 3 can be kept open at a desired angle relative to the main body 2 by virtue of frictional force generated between the movable washer 17 and the fixed washer 16.

As illustrated in FIG. 2, the supporter 14 further includes a bracket 19 fixed to the main body 2 through a fixation plate 18, for instance, a bracket 20 fixed to the upper cover 3, and a rotation shaft 21 through which the upper cover 3 and the main body 2 open and close to each other.

The rotation shaft 21 is fixed to the upper cover 3 through the bracket 20.

The rotation shaft 21 is inserted into the bracket 19 to thereby be supported by the main body 2 through the bracket 19. Hence, the rotation shaft 21 is rotatable around a rotation axis thereof together with the upper cover 3.

The rotation shaft 21 is comprised of a greater-diameter portion 21a and a smaller-diameter portion 21b. A step formed between them is in alignment with a left-side surface of the bracket 19, resulting in that the bracket 19 does not allow the rotation shaft 21 to move to the right in FIG. 2.

The supporter 14 further includes torsion coil springs 22 into which the rotation shaft 21 is inserted.

Each of the torsion coil springs 22 is comprised of a coil 23, and a pair of extensions 24, 25 extending from the coil 23. A smaller-diameter portion 26 of the rotation shaft 21 is inserted into the coils 23, and hence, the torsion coil springs 23 are rotatable relative to the rotation shaft 21, and are not fallen out of the rotation shaft 21.

One of the extensions 25 of the torsion coil spring 22 is fixed at a distal end thereof to the main body 2 through a fixation pad 27 and a fixation plate 18, and the other of the extensions 24 is fixed at a distal end thereof to the upper cover 3 through a fixation pad 28 and the bracket 20.

Thus, the torsion coil springs 22 define an energizer for energizing the upper cover 3 to open relative to the main body 2 around the rotation shaft 21 by virtue of torsion repulsive force of the torsion coil springs 22.

In the first embodiment, the extensions 24 and 25 of the torsion coil spring 22 form an angle (an angle in a plane perpendicular to an axis of the coil 23) of 90 degrees therebetween, for instance.

Accordingly, the torsion coil springs 22 provides the upper cover 3 with such angular moment that the upper cover 3 opens relative to the main body at 90 degrees.

If the upper cover 3 opens relative to the main body 2 at an angle beyond 90 degrees, the torsion coil springs 22 provides the upper cover 3 with such angular moment that the upper cover 3 returns back to a position at which the upper cover 3 forms an angle of 90 degrees with the main body 2.

The supporter 14 further includes a fixed washer 16, a movable washer 17, Belleville springs 29 and a nut 30, into all of which the rotation shaft 21 is inserted at a side opposite to the torsion coil springs 22 with respect to the bracket 19. The nut 30 prevents the movable washer 17 and the Belleville springs 29 from falling out of the rotation shaft 21.

Hereinbelow are explained structures of the fixed washer 16 and the movable washer 17 with reference to FIGS. 3 and 4.

Figure 3B:
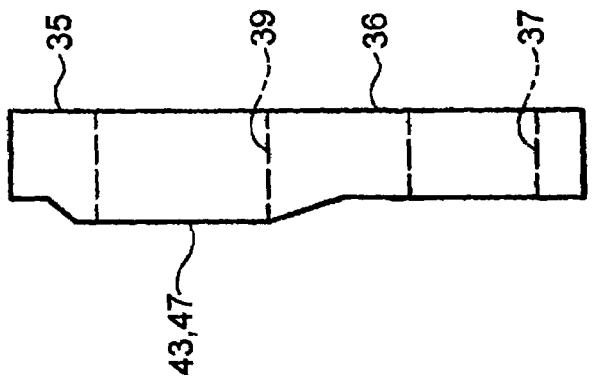
FIG. 3B is a rear view of the fixed washer illustrated in FIG. 3A, viewed from a rear of FIG. 2.
Figure 3A:
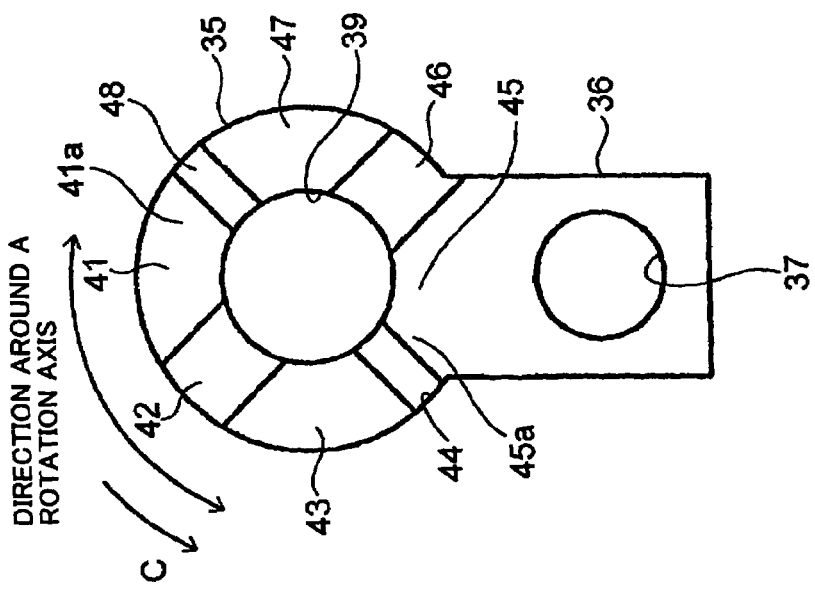
FIG. 3A is a side view of a fixed washer, showing a surface at which the fixed washer makes contact with a movable washer.

FIG. 3A is a side view of the fixed washer 16, showing a surface at which the fixed washer 16 makes contact with the movable washer 17, and FIG. 3B is a rear view of the fixed washer 16, viewed from a rear of FIG. 2.

Figure 4B:
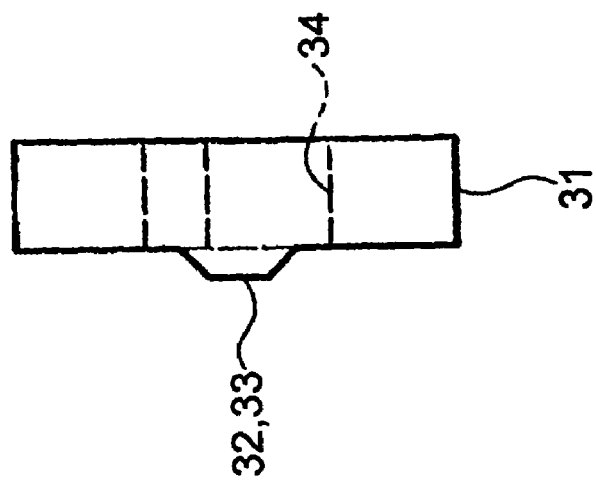
FIG. 4B is a front view of the movable washer illustrated in FIG. 4A, viewed from a front of FIG. 2.
Figure 4A:
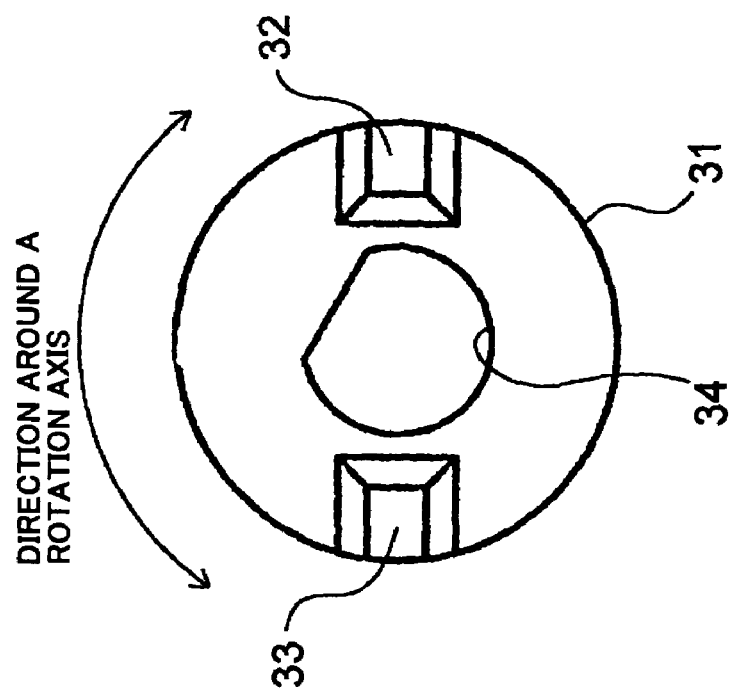
FIG. 4A is a side view of a movable washer, showing a surface at which the movable washer makes contact with a fixed washer.

FIG. 4A is a side view of the movable washer 17, showing a surface at which the movable washer 17 makes contact with the fixed washer 16, and FIG. 4B is a front view of the movable washer 17, viewed from a front of FIG. 2.

As illustrated in FIG. 4, the movable washer 17 has a ring-shaped body 31 having flat upper and lower surfaces in parallel with each other.

On one of the surfaces of the body 31 of the movable washer 17, that is, on a surface at which the movable washer 17 makes contact with the fixed washer 16 are formed projections 32 and 33 projecting towards the fixed washer 16.

In the first embodiment, the movable washer 17 is designed to have a first projection 32 and a second projection 33 spaced away from each other around a rotation axis of the rotation shaft 21 (for instance, by 180 degrees).

The body 31 of the movable washer 17 is formed centrally with a through-hole 34 into which the rotation shaft 21 is inserted.

The rotation shaft 21 is designed to have a non-circular cross-section at a portion thereof at which the rotation shaft 21 is inserted into the movable washer 17 and the Belleville springs 29, in order not to allow the movable washer 17 and the Belleville springs 29 to rotate around a rotation axis of the rotation shaft 21. Specifically, the rotation shaft 21 is designed to have a D-shaped (D-cut) cross-section at a portion thereof at which the rotation shaft 21 is inserted into the movable washer 17 and the Belleville springs 29.

In line with the D-shaped cross-section of the rotation shaft 21, the through-hole 34 of the movable washer 17 has a D-shaped cross-section, and the Belleville springs 29 are designed to have a D-shaped through-hole (not illustrated) into which the rotation shaft 21 is inserted.

Thus, when the rotation shaft 21 rotates around a rotation axis thereof, the movable washer 17 and the Belleville springs 29 into which the rotation shaft 21 is inserted rotate around the rotation axis of the rotation shaft 21 together with the rotation shaft 21.

The movable washer 17 and the Belleville springs 29 can move axially of the rotation shaft 21.

As illustrated in FIG. 3, the fixed washer 16 is comprised of a ring-shaped body 35 having the almost same outer diameter as that of the body 31 of the movable washer 17, and a plate 36 integrally formed with the body 35 and fixed to the bracket 19. The plate 36 is formed rectangular, for instance.

The plate 36 is formed with a through-hole 37. As illustrated in FIG. 2, the fixed washer 16 is fixed to the bracket 19 by fastening a fastener 38 such as a screw to the bracket 19 through the through-hole 37.

The body 35 of the fixed washer 16 is formed centrally with a through-hole 39 into which the rotation shaft 21 is inserted. The through-hole 39 has a circular cross-section, and hence, the fixed washer 16 is rotatable around a rotation axis of the rotation shaft 21. This also means that the rotation shaft 21 is movable axially of the fixed washer 16.

On one of surfaces of the body 35, that is, on a surface of the body 35 at which the fixed washer 16 makes contact with the movable washer 17 are formed first and second raised portions (projections) 43 and 47 projecting towards the movable washer 17, first and second lower-level portions 41 and 45 formed lower than the first and second raised portions 43 and 47, and not projecting towards the movable washer 17, a first upwardly-inclining portion 42 upwardly inclining to the first raised portion 43 from the first lower-level portion 41, a second upwardly-inclining portion 46 upwardly inclining to the second raised portion 47 from the second lower-level portion 45, a first downwardly-inclining portion 44 downwardly inclining to the second lower-level portion 45 from the first raised portion 43, and a second downwardly-inclining portion 48 downwardly inclining to the first lower-level portion 41 from the second raised portion 47.

That is, the fixed washer 16 is formed at a surface facing the movable washer 17 with the first lower-level portion 41, the first upwardly-inclining portion 42, the first raised portion 43 (first projection), the first downwardly-inclining portion 44, the second lower-level portion 45, the second upwardly-inclining portion 46, the second raised portion (second projection) 47, and the second downwardly-inclining portion 48, arranged in this order in a direction around a rotation axis of the rotation shaft 21.

In the body 35, an area in which the first lower-level portion 41, the first upwardly-inclining portion 42, the first raised portion 43, and the first downwardly-inclining portion 44 are formed is in line-symmetry with an area in which the second lower-level portion 45, the second upwardly-inclining portion 46, the second raised portion 47, and the second downwardly-inclining portion 48 are formed.

The first and second raised portions 43 and 47 are designed to have the same height, and to have top surfaces in parallel with each other. The first and second lower-level portions 41 and 45 are designed to have the same height, and to have top surfaces in parallel with each other.

Furthermore, the first and second raised portions 43 and 47 and the first and second lower-level portions 41 and 45 are in parallel with each other.

Furthermore, the first and second raised portions 43 and 47 and the first and second lower-level portions 41 and 45 are formed flat.

The body 35 is formed relatively thick and has a constant thickness in an area in which the first and second raised portions 43 and 47 are formed, and is formed relatively thin and has a constant thickness in an area in which the first and second lower-level portions 41 and 45 are formed. The body 35 has a gradually increasing thickness from the lower-level portions 41 and 45 to the raised portions 43 and 47 in an area in which the first and second upwardly-inclining portions 42 and 46 are formed, and has a gradually decreasing thickness from the raised portions 43 and 47 to the lower-level portions 45 and 41 to in an area in which the first and second downwardly-inclining portions 44 and 48 are formed. An inclination angle of the first and second downwardly-inclining portions 44 and 48 is greater than an inclination angle of the first and second upwardly-inclining portions 42 and 46.

A thickness of the body 35 in an area in which the lower-level portions 41 and 45 are formed is equal to a thickness of the plate 36.

The first and second raised portions 43 and 47 of the fixed washer 16 are designed to have positions and circumferential angles and the through-hole 34 of the movable washer 17 is designed to have a D-shaped cross-section directed such that when the upper cover 3 is made open relative to the main body 2 at an angle in the range of 90 to 165 degrees (a predetermined range), for instance, the first raised portion 43 of the fixed washer 16 and the first projection 32 of the movable washer 17 overlap each other axially of the rotation shaft 21, and the second raised portion 47 of the fixed washer 16 and the second projection 33 of the movable washer 17 overlap each other axially of the rotation shaft 21.

Hereinbelow is explained an example of a process of assembling the fixed washer 16, the movable washer 17, the Belleville springs 29 and the nut 30.

First, the fixed washer 16 is inserted around the rotation shaft 21 carried rotatably at the bracket 19, through an end of the rotation shaft 21 located at the right in FIG. 2 such that the first and second raised portions 43 and 47 faces the right in FIG. 2.

Then, the plate 36 of the fixed washer 16 is fixed to the bracket 19 by means of the fastener 38 such as a screw. Though the fixed washer 16 is fixed to the bracket 19 by means of the fastener 38 in the first embodiment, the fixed washer 16 may be fixed to the bracket 19, for instance, by spot-welding.

Then, the movable washer 17 is inserted around the rotation shaft 21 through an end of the rotation shaft 21 located at the right in FIG. 2 such that the first and second projections 32 and 33 faces the left in FIG. 2, that is, faces the fixed washer 16.

Then, four Belleville springs 29 are inserted around the rotation shaft 21 through an end of the rotation shaft 21 located at the right in FIG. 2 such that the four Belleville springs 29 are alternately oppositely directed.

Then, the nut 30 is inserted around the rotation shaft 21 through an end of the rotation shaft 21 located at the right in FIG. 2, and screwed to the rotation shaft 21 such that the Belleville springs 29 and the movable washer 17 are not fallen out of the rotation shaft 21.

It is possible to control frictional force generated between the fixed washer 16 and the movable washer 17, that is, torque necessary for opening or closing the upper cover 3, by controlling a degree in which the nut 30 is screwed.

For instance, the torque is preferably in the range of 2 kgf/cm to 4 kgf/cm. If necessary, the torque may be greater.

When the requisite torque is obtained, calking 40 is applied to an end of the rotation shaft 21 to prevent the nut 30 from loosening.

The Belleville springs (resilient unit) 29, the nut (restrictor) 30 and the calking (restrictor) 40 define an energizer for energizing the movable washer 17 towards the fixed washer 16.

The torque may be varied, for instance, by replacing the Belleville springs 29 with Belleville springs having a different spring strength, changing the number of the Belleville springs 29, replacing the movable washer 17 with another movable washer having the projections 32 and 33 having another height, or replacing the fixed washer 16 with another fixed washer 16 having the raised portions 43 and 47 having another height.

Hereinbelow is explained an operation of the hinge.

While the upper cover 3 opens relative to the main body 2 at an angle between 0 to 165 degrees, the first projection 32 of the movable washer 17 makes contact with one of the first lower-level portion 41, the first upwardly-inclining portion 42 and the first raised portion 43 of the fixed washer 16, and the second projection 33 of the movable washer 17 makes contact with one of the second lower-level portion 45, the second upwardly-inclining portion 46 and the second raised portion 47 of the fixed washer 16 in dependence on a relative angle between the upper cover 3 and the main body 2.

The upper cover 3 opens or closes relative to the main body 2 by rotating the upper cover 3 relative to the main body 2. As the upper cover 3 rotates, the rotation shaft 21 rotates together, and as the rotation shaft 21 rotates, the movable washer 17 rotates around a rotation axis of the rotation shaft 21. When the upper cover 3 is closed to the main body 2 (an angle formed therebetween is zero), the first projection 32 of the movable washer 17 makes contact with the first lower-level portion 41 at a starting position 41a (see FIG. 3). While the upper cover 3 opens relative to the main body 2 at an angle in the range of zero and about 70 degrees, the first projection 32 of the movable washer 17 moves on the first lower-level portion 41 around a rotation axis of the rotation shaft 21 (in a direction C in FIG. 3). While the upper cover 3 opens relative to the main body 2 at an angle in the range of about 70 and about 90 degrees, the first projection 32 of the movable washer 17 moves on the first upwardly-inclining portion 42 around a rotation axis of the rotation shaft 21. While the upper cover 3 opens relative to the main body 2 at an angle in the range of about 90 and about 165 degrees, the first projection 32 of the movable washer 17 moves on the first raised portion 43 around a rotation axis of the rotation shaft 21.

Similarly, when the upper cover 3 is closed to the main body 2, the second projection 33 of the movable washer 17 makes contact with the second lower-level portion 45 at a starting position 45a (see FIG. 3). While the upper cover 3 opens relative to the main body 2 at an angle in the range of zero and about 70 degrees, the second projection 33 of the movable washer 17 moves on the second lower-level portion 45 around a rotation axis of the rotation shaft 21. While the upper cover 3 opens relative to the main body 2 at an angle in the range of about 70 and about 90 degrees, the second projection 33 of the movable washer 17 moves on the second upwardly-inclining portion 46 around a rotation axis of the rotation shaft 21. While the upper cover 3 opens relative to the main body 2 at an angle in the range of about 90 and about 165 degrees, the second projection 33 of the movable washer 17 moves on the second raised portion 47 around a rotation axis of the rotation shaft 21.

In a process of opening the upper cover 3, when the first and second projections 32 and 33 of the movable washer 17 is in contact with the first and second lower-level portions 41 and 45 of the fixed washer 16, that is, when the upper cover 3 opens relative to the main body 2 at an angle in the range of 0 to about 70 degrees, the Belleville springs 29 sandwiched between the movable washer 17 and the nut 30 is compressed relatively in a small degree, and hence, frictional force generated between the movable washer 17 and the fixed washer 16 due to resilient force generated in the Belleville springs 29 is relatively small. In addition, the upper cover 3 is energized by the torsion coil springs 22 to open. Thus, it is possible to open the upper cover 3 with small force.

In a process of opening the upper cover 3, when the first and second projections 32 and 33 of the movable washer 17 is in contact with the first and second upwardly-inclining portions 42 and 46 of the fixed washer 16, that is, when the upper cover 3 opens relative to the main body 2 at an angle in the range of about 70 to about 90 degrees, the Belleville springs 29 are gradually increasingly compressed as the movable washer 17 is pushed by the fixed washer 16, and resultingly, moves towards the nut 30. Hence, frictional force generated between the movable washer 17 and the fixed washer 16 due to resilient force generated in the Belleville springs 29 gradually increases. In addition, repulsion force generated in the torsion coil springs 22 to open the upper cover 3 weakens. Thus, the upper cover 3 opens with increasing resistance.

The frictional force generated between the movable washer 17 and the fixed washer 16 when the upper cover 3 opens relative to the main body 2 at about 90 degrees is sufficient to keep the upper cover open as it is, even if a user does not support the upper cover 3. That is, it is possible to obtain force for preventing rotation of the upper cover 3.

In a process of opening the upper cover 3, when the first and second projections 32 and 33 of the movable washer 17 is in contact with the first and second raised portions 43 and 47 of the fixed washer 16, that is, when the upper cover 3 opens relative to the main body 2 at an angle in the range of about 90 to about 165 degrees, the frictional force generated between the movable washer 17 and the fixed washer 16 is sufficient to keep the upper cover open at any angle, even if a user does not support the upper cover 3.

Angular moment with respect to the rotation shaft 21 is applied to the upper cover 3 due to its own weight. The angular moment is smallest when the upper cover 3 stands perpendicularly to the main body 2, and gradually increases as the upper cover 3 rotates relative to the main body 2. However, since the torsion coil springs 22 energizes the upper cover 3 to make the upper cover 3 stand perpendicularly to the main body 2, as mentioned earlier, the angular moment is reduced.

That is, when the upper cover 3 opens relative to the main body 2 at an angle beyond 90 degrees, even if the angular moment applied to the upper cover 3 gradually increases, the angular moment is partially cancelled with repulsion force of the torsion coil springs 22.

Hence, the force for stopping the rotation of the upper cover 3 is kept almost constant, even if the frictional force generated between the movable washer 17 and the fixed washer 16 when the upper cover 3 opens relative to the main body 2 at an angle in the range of about 90 to about 165 degrees.

Accordingly, it is possible to keep the upper cover 3 open with resistance at an angle (generally, in the range of about 90 to about 145 degrees) at which a user can readily see a screen of the note-type personal computer 1, and furthermore, it is possible to keep the upper cover 3 not fall down due to its own weight even when the upper cover 3 opens relative to the main body 2 at an angle in the range of about 150 to about 165 degrees.

In Japanese Patent Application Publication No. 2004-3594, resistive force of the hinge is constant independently of an angle at which the upper cover 3 is open relative to the main body. Thus, if the hinge has too high resistive force, the upper cover would open with high resistance. Hence, it was necessary to suppress resistive force of the hinge to some degree, resulting in that sufficient resistive force cannot be ensured when the upper cover opens relative to the main body at 150 to 160 degrees, and thus, the upper cover 3 might fall down due to its own weight.

In contrast, in accordance with the first embodiment, the first and second projections 31 and 32 of the movable washer 17 is in contact with the lower-level portions 41 and 45 of the fixed washer 16 when the upper cover 3 opens relative to the main body 2 at an angle in the range of zero and 70 degrees, for instance, and hence, it is possible to suppress resistive force caused by the hinge, that is, the supporters 14 and 15, and to allow the first and second projections 32 and 33 of the movable washer 17 to make contact with the raised portions 43 and 47 of the fixed washer 16 only in a range of angles (for instance, about 90 to about 165 degrees) at which a user would like to keep the upper cover 3 open, ensuring that the resistive force caused by the supporters 14 and 15 can be increased. Thus, it is possible to generate sufficient resistive force in a range of angles at which a user would like to keep the upper cover 3 open, ensuring it possible to prevent the upper cover 3 from falling down due to its own weight even when the upper cover 3 opens relative to the main body 2 at 150 to 160 degrees.

When the upper cover 3 is to close relative to the main body 2, there is no resistance caused by frictional force generated between the movable washer 17 and the fixed washer 16, if an angle formed between the upper cover 3 and the main body 2 is equal to or smaller than 70 degrees. Hence, a user can close the upper cover 3 with small force. Though the resistance is cancelled, the repulsion force of the torsion coil springs 22 gradually increases. Thus, it would be possible to weaken impact generated when the upper cover 3 is just closed to the main body 2. That is, the torsion coil springs 22 act as dumpers when the upper cover 3 is closed to the main body 2.

A user has opened the upper cover 3 of the note-type personal computer 1 so far, feeling that the upper cover was firm and heavy. In accordance with the first embodiment, it is possible for a user to open and close the upper cover with minimum resistance.

For instance, even when a user uses the note-type personal computer 1 in an express train or in an automobile, a problem that a screen of a display, that is, the upper cover 3 is vibrated, and thus, a user cannot see the screen straightly is solved.

In addition, the hinge can be designed to be able to be fabricated smaller and at lower costs, and have longer lifetime, ensuring enhancement in productivity.

A range of angles at which the upper cover 3 opens or closes with resistance relative to the main body 2 can be varied in dependence on a location of the first and second projections 32 and 33 of the movable washer 17 and the raised portions 43 and 47 of the fixed washer 16, and a circumferential angle in which the first and second projections 32 and 33 and the raised portions 43 and 47 extend. For instance, it is preferable that they are designed to provide sufficient resistance when the upper cover 3 is open relative to the main body 2 at about 80 to about 90 degrees.

Furthermore, the resistance with which the upper cover 3 opens or closes relative to the main body 2 can be varied by changing heights of the first and second projections 32 and 33 of the movable washer 17 and the raised portions 43 and 47 of the fixed washer 16.

Second Embodiment

In the above-mentioned first embodiment, the force for stopping the rotation of the upper cover 3 can be generated only when the upper cover 3 opens relative to the main body 2 at an angle equal to or smaller than about 165 degrees, because of the structures of the fixed washer 16 and the movable washer 17. It is impossible to generate the force when the upper cover 3 opens relative to the main body 2 at an angle equal to or greater than 180 degrees, even though the downwardly-inclining portions 44 and 48 had a minimum width.

Hence, the second embodiment is designed to include a fixed washer 50 (FIG. 5) and a movable washer 70 (FIG. 6) both of which are capable of providing a broader range of angles at which the above-mentioned force can be generated, in place of the fixed washer 16 and the movable washer 17 mentioned in the first embodiment.

Since the second embodiment is identical in structure with the first embodiment except that the fixed washer 50 and the movable washer 70 are partially different in structure from the fixed washer 16 and the movable washer 17 in the first embodiment, parts or elements that correspond to those of the first embodiment have been provided with the same reference numerals, and will not be explained.

Figure 5:
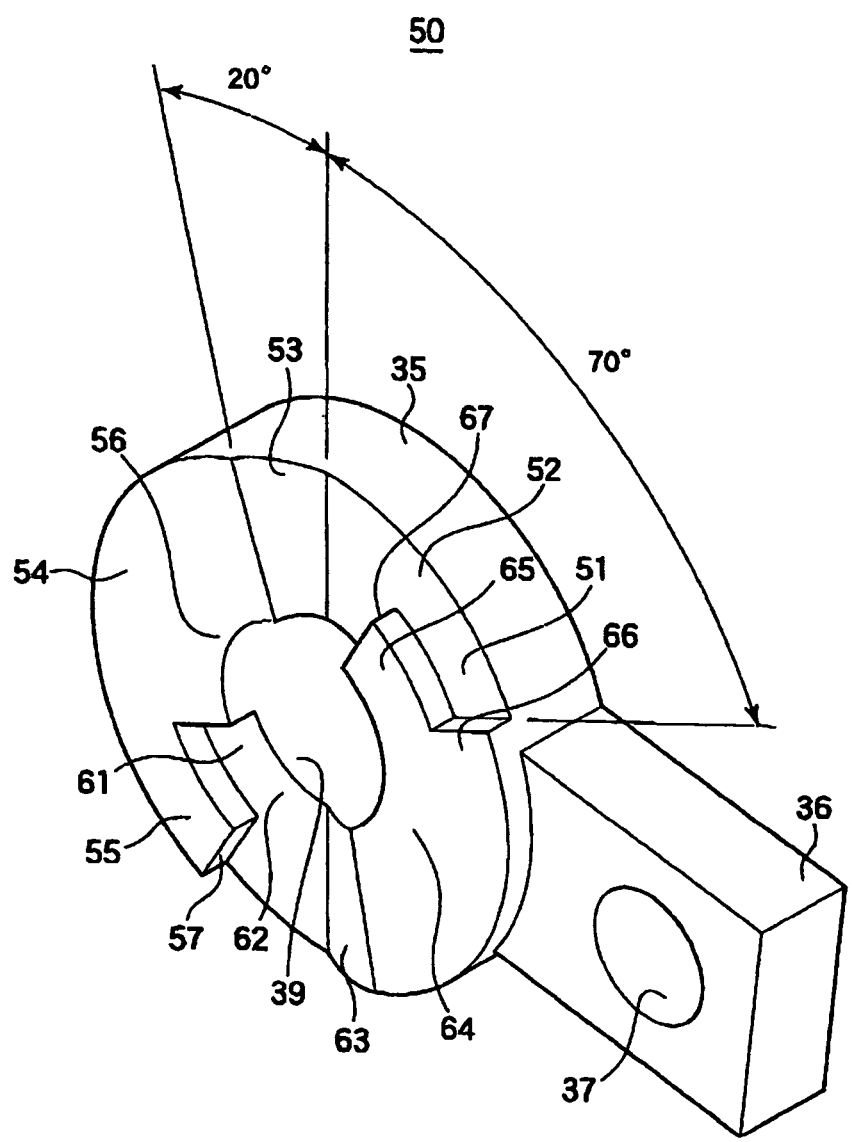
FIG. 5 illustrates a fixed washer (fixed part) as a part of the supporter (hinge) in the second embodiment.
Figure 6:
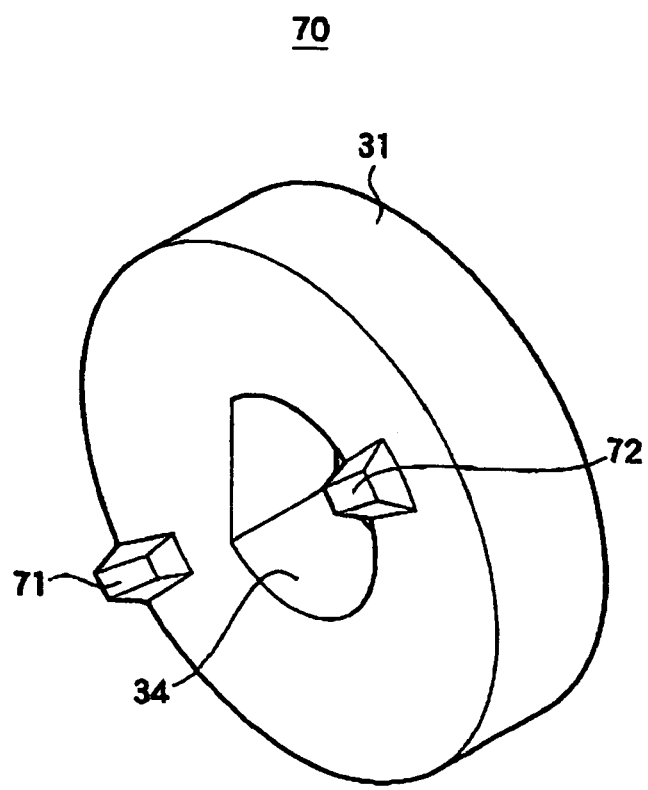
FIG. 6 illustrates a movable washer (movable part) as a part of the supporter (hinge) in the second embodiment.
Figure 7:
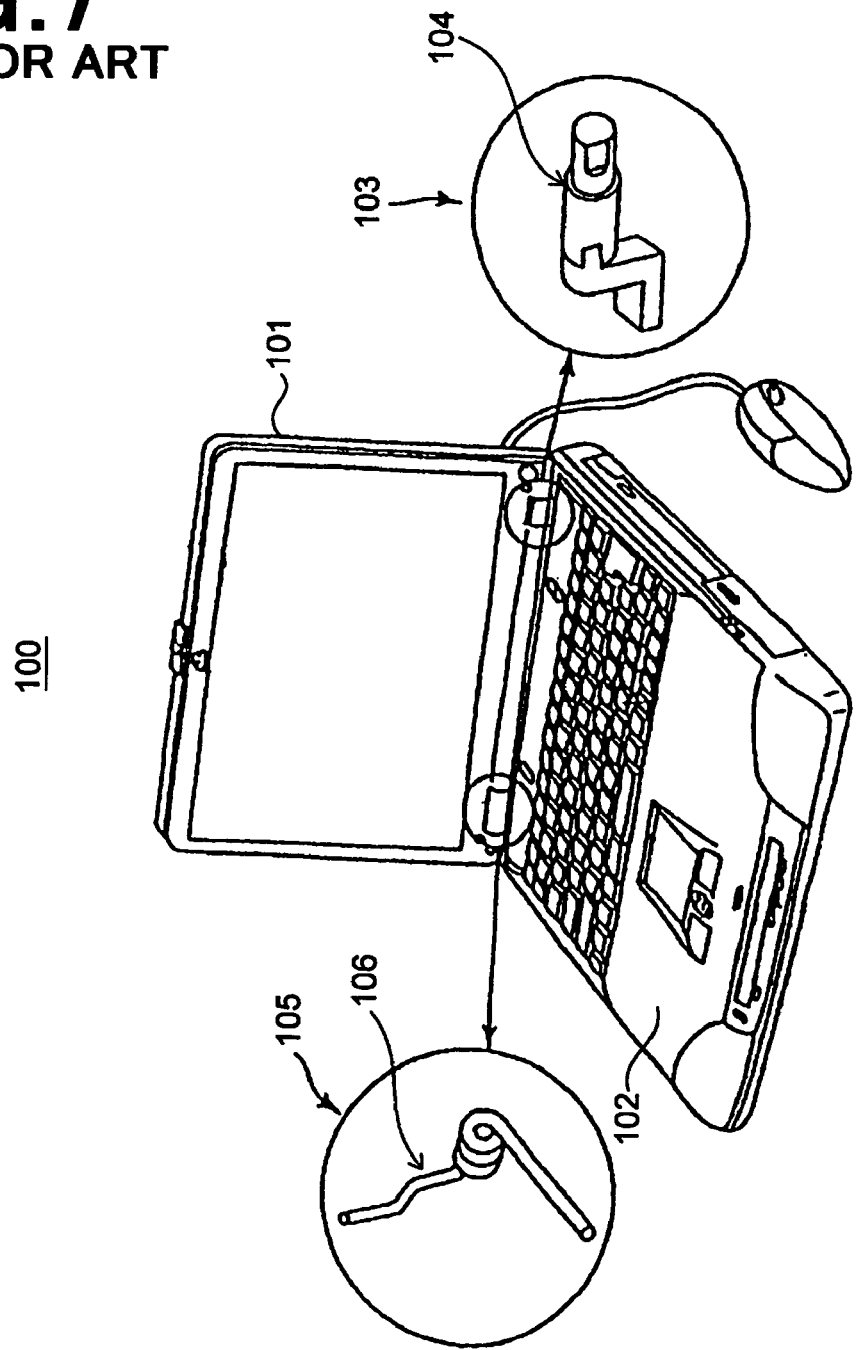
FIG. 7 is a perspective view of the note-type personal computer disclosed in the reference.

FIG. 5 is a perspective view of the fixed washer 50 in the second embodiment, and FIG. 6 is a perspective view of the movable washer 70 in the second embodiment.

The fixed washer 50 and the movable washer 70 illustrated in FIGS. 5 and 6 are equipped in the supporter 15 disposed at the right in FIG. 1, and the fixed washer and the movable washer equipped in the supporter 14 disposed at the left are symmetric in structure with the fixed washer 50 and the movable washer 70 illustrated in FIGS. 5 and 6.

As illustrated in FIG. 6, the movable washer 70 in the second embodiment has projections 71 and 72 positioned differently from the projections of the movable washer 17 in the first embodiment.

One of the projections 71 and 72 of the movable washer 70 in the second embodiment defines an inner projection 72 located inwardly around a rotation axis of the rotation shaft 21, and moves along an inner route, and the other defines an outer projection 71 located outwardly around a rotation axis of the rotation shaft 21, and moves along an outer route.

The outer projection 71 and the inner projection 72 are spaced away from each other in a direction around a rotation axis of the rotation shaft 21 (for instance, by 180 degrees).

As illustrated in FIG. 5, on one of surfaces of the fixed washer 50, that is, on a surface of the fixed washer 50 facing the movable washer 70 are formed first and second raised portions (projections) 54 and 64 projecting towards the movable washer 70, first and second lower-level portions 52 and 62 formed lower than the first and second raised portions 54 and 64, and not projecting towards the movable washer 70, a first upwardly-inclining portion 53 upwardly inclining to the first raised portion 54 from the first lower-level portion 52, a second upwardly-inclining portion 63 upwardly inclining to the second raised portion 64 from the second lower-level portion 62, a first downwardly-stepped portion 57 downwardly inclining to the second lower-level portion 62 from the first raised portion 54, and a second downwardly-stepped portion 67 downwardly inclining to the first lower-level portion 52 from the second raised portion 64.

That is, the fixed washer 50 is formed at a surface facing the movable washer 70 with the first lower-level portion 52, the first upwardly-inclining portion 53, the first raised portion 54, the first downwardly-stepped portion 57, the second lower-level portion 62, the second upwardly-inclining portion 63, the second raised portion 64, and the second downwardly-stepped portion 67, arranged in this order in a direction around a rotation axis of the rotation shaft 21.

The first and second raised portions 54 and 64 are designed to have the same height, and to have top surfaces in parallel with each other. The first and second lower-level portions 52 and 62 are designed to have the same height, and to have top surfaces in parallel with each other Furthermore, the first and second raised portions 54 and 64 and the first and second lower-level portions 52 and 62 are in parallel with each other.

Furthermore, the first and second raised portions 54 and 64 and the first and second lower-level portions 52 and 62 are formed flat.

The body 35 is formed relatively thick and has a constant thickness in an area in which the first and second raised portions 54 and 64 are formed, and is formed relatively thin and has a constant thickness in an area in which the first and second lower-level portions 52 and 62 are formed. The body 35 has a gradually increasing thickness from the lower-level portions 52 and 62 to the raised portions 54 and 64 in an area in which the first and second upwardly-inclining portions 53 and 63 are formed.

In the first lower-level portion 52, the first upwardly-inclining portion 53, and the first raised portion 54 of the fixed washer 50, an outer area in a direction around a rotation axis of the rotation shaft 21 is now called a first area. The outer projection 71 of the movable washer 70 makes contact with the first area, and moves in the first area in dependence on an angle at which the upper cover 3 opens relative to the main body 2. The outer projection 71 of the movable washer 70 makes contact with a starting position 51 in the first lower-level portion 52 when the upper cover 3 is closed relative to the main body 2 (an angle formed between the upper cover 3 and the main body 2 is zero).

Similarly, in the second lower-level portion 62, the second upwardly-inclining portion 63, and the first raised portion 64 of the fixed washer 50, an inner area in a direction around a rotation axis of the rotation shaft 21 is now called a second area. The inner projection 72 of the movable washer 70 makes contact with the second area, and moves in the second area in dependence on an angle at which the upper cover 3 opens relative to the main body 2. The inner projection 72 of the movable washer 70 makes contact with a starting position 61 in the second lower-level portion 62 when the upper cover 3 is closed relative to the main body 2 (an angle formed between the upper cover 3 and the main body 2 is zero).

In the second embodiment, as illustrated in FIG. 5, a range of an angle in which the first area extends and a range of an angle in which the second area extends around a rotation axis of the rotation shaft 21 are designed to be equal to or greater than 180 degrees, and the first and second areas partially overlap each other angularly.

In the first raised portion 54, an area 55 which is located outwardly around a rotation axis of the rotation shaft 21 and in which the outer projection 71 can move keeping contact therewith extends in a greater angle than an angle in which an area located inwardly around the rotation axis of the rotation shaft 21 extends. In the second raised portion 64, an area 65 which is located inwardly around a rotation axis of the rotation shaft 21 and in which the inner projection 72 can move keeping contact therewith extends in a greater angle than an angle in which an area located outwardly around the rotation axis of the rotation shaft 21 extends. That is, the areas 55 and 65 extend to a region in which a lower-level portion is formed in the first embodiment.

Thus, in the second embodiment, even if the upper cover 3 opens relative to the main body 2 at an angle beyond 180 degrees (for instance, at 200 degrees), it would be possible to cause the first and second projections 71 and 72 of the movable washer 70 and the raised portions 54 and 64 of the fixed washer 50 to make contact with each other, ensuring that the force can be generated for stopping the rotation of the upper cover 3 due to the frictional force between them.

In addition, since the second embodiment includes the downwardly-stepped portions 57 and 67 both of which are not necessary to have a dimension in a direction around a rotation axis of the rotation shaft 21, in place of the downwardly-inclining portions 44 and 48 in the first embodiment, it is possible to effectively utilize an area of the fixed washer 50 in a direction around a rotation axis of the rotation shaft 21. This ensures that a wider range of an angle at which the force for stopping the rotation of the upper cover 3 can be generated.

In the above-mentioned embodiments, the first portion (for instance, the main body 2) and the second portion (for instance, the upper cover 3) are carried at with a pair of the supporters including the hinges in accordance with the present invention. It should be noted that the hinge in accordance with the present invention may be applied to only one of the supporters.

For instance, one of the supporters may include the resistive hinge disclosed in Japanese Patent Application Publication No. 2004-3594, in which case, it would be possible to have the force for stopping the rotation of the upper cover 3 in a wider range of an angle than a range of an angle at which the upper cover 3 can be kept not rotated in Japanese Patent Application Publication No. 2004-3594.

Japanese Patent Application Publication No. 2004-3594 further discloses the upper cover 3 which automatically opens or closes by means of a motor. The hinge in accordance with the present invention may be applied to an open-cover type personal computer including a unit for automatically opening and closing an upper cover. This prevents occurrence of backlash caused by frequently used and hence worn gears.

In the first embodiment, the fixed washer 16 is designed to have the downwardly-inclining portions 44 and 48. The fixed washer 16 may be designed to have the downwardly-stepped portions 57 and 67 having been explained in the second embodiment, in place of the downwardly-inclining portions 44 and 48. This ensures that the raised portions 43 and 47 can be formed in a wider angle around a rotation axis of the rotation shaft 21, and hence, it is possible to generate the force for stopping the rotation of the upper cover 3 in a wider range of an angle.

In the above-mentioned first and second embodiments, the fixed washers 16 and 50 are explained as the first part, and the movable washers 17 and 70 are explained as the second part. In contrast, the fixed washer may be formed as the second part, and the movable washer may be formed as the first part (which includes lower-level portions, upwardly-inclining portions, raised portions and so on).

In the above-mentioned first and second embodiments, the main body 2 is explained as the first portion, and the upper cover 3 is explained as the second portion. In contrast, the main body 2 may be formed as the second portion, and the upper cover 3 may be formed as the first portion.

In the above-mentioned first and second embodiments, the fixed washers 16 and 50 are formed separately from the bracket 19. It should be noted that it would not be necessary to prepare the fixed washers 16 and 50, if all of the parts formed on a surface of the fixed washers 16 and 50 facing the movable washers 17 and 70 were formed on a surface of the bracket 19 facing the movable washers 17 and 70, for instance, in which case, the bracket 19 defines "the fixed part".

The hinge in accordance with the present invention may be applied not only to the note-type personal computer 1, but also to a supporter used for a unit including a part which opens or closes relative to other part. For instance, the hinge in accordance with the present invention may be applied to an electric pot including a tank reserving hot water therein, and a cover supported at a top of the tank such that the cover is able to open or close relative to the tank.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Applications No. 2003-361231 and 2004-256907 filed on Sep. 12, 2003 and Sep. 3, 2004 including specification, claims, drawings and summary is incorporated herein by reference in its entirety.

What is claimed is:

1. A hinge supporting a first portion and a second portion such that said first portion and said second portion open and closed relative to each other, the hinge comprising:
    a rotation shaft fixed to said second portion and supported by said first portion such that said rotation shaft is rotatable around a rotation axis thereof relative to said first portion;
    a first part into which said rotation shaft is inserted;
    a second part into which said rotation shaft is inserted;
    a first energizer; and
    a second energizer comprising at least one torsion coil spring into which said rotation shaft is inserted for energizing said first and second portions to open relative to each other around said rotation shaft, wherein said torsion coil spring comprises a coil and a pair of extensions extending from said coil, wherein one of said extensions is fixed to one of said first and second portions and the other of said extensions is fixed to the other of said first and second portions,
    wherein one of said first and second parts defines a fixed part fixed to said first portion such that said rotation shaft is rotatable around said rotation axis relative to said fixed part,
    the other of said first and second parts defines a movable part which is axially movable relative to said rotation shaft and not independently rotatable around a rotation axis thereof relative to said rotation shaft so that the movable part rotates together with said rotation shaft when said rotation shaft rotates around said rotation axis thereof relative to said first portion,
    said first part has a projection projecting towards said second part, and said second part has a projection projecting towards said first part, said projections overlapping each other axially of said rotation shaft when said first and second portions are open to each other at a certain angle in a range of predetermined angles,
    said first energizer energizes said movable part towards said fixed part, and
    when said first and second portions are open to each other at a certain angle in the range of said predetermined angles, said first and second portions are kept open at said certain angle by virtue of frictional force generated between said projection of said fixed part and said projection of said movable part.

2. The hinge as set forth in claim 1, wherein said first energizer is comprised of a resilient unit making contact with a surface of said movable part located oppositely to said fixed part, and a restrictor restricting said resilient unit to be compressed by said movable part to move far away from said fixed part.

3. The hinge as set forth in claim 2, wherein said resilient unit is comprised of a Belleville spring into which said rotation shaft is inserted between said restrictor and said movable part.

4. The hinge as set forth in claim 1, wherein said first part is formed at a surface thereof facing said second part with a lower-level portion lower than said projection of said first part, an upwardly-inclining portion upwardly inclining from said lower-level portion to said projection of said first part, and said projection of said first part, arranged in this order circumferentially of said rotation axis of said rotation shaft.

5. The hinge as set forth in claim 1, wherein each of said first and second parts has two projections arranged circumferentially of said rotation axis of said rotation shaft and spaced away from each other,
    one of said two projections of said first part makes contact with one of said two projections of said second part, and the other of said two projections of said first part makes contact with the other of said two projections of said second part to provide frictional force for keeping said first and second portions open at said certain angle.

6. The hinge as set forth in claim 5, wherein said first part is formed at a surface thereof facing said second part with:
    a first lower-level portion lower than a first projection which is one of two projections of said first part;
    a first upwardly-inclining portion upwardly inclining from said first lower-level portion to said first projection;
    said first projection;
    a first downwardly-inclining or downwardly-stepped portion lowering from said first projection;
    a second lower-level portion lower than a second projection which is the other of two projections of said second part;
    a second upwardly-inclining portion upwardly inclining from said second lower-level portion to said second projection;
    said second projection; and
    a second downwardly-inclining or downwardly-stepped portion lowering from said second projection,
    all arranged in this order circumferentially of said rotation axis of said rotation shaft.

7. The hinge as set forth in claim 1, wherein said projection of said first part and said projection of said second part are equal in height to each other.

8. The hinge as set forth in claim 6, wherein said first lower-level portion and said second lower-level portion are equal in height to each other.

9. A hinge supporting a first portion and a second portion such that said first portion and said second portion open and closed relative to each other, the hinge comprising:
    a rotation shaft fixed to said second portion and supported by said first portion such that said rotation shaft is rotatable around a rotation axis thereof relative to said first portion;

a first part into which said rotation shaft is inserted;
a second part into which said rotation shaft is inserted; and
an energizer,
wherein one of said first and second parts defines a fixed part fixed to said first portion such that said rotation shaft is rotatable around said rotation axis relative to said fixed part,
the other of said first and second parts defines a movable part which is axially movable relative to said rotation shaft and not independently rotatable around a rotation axis thereof relative to said rotation shaft so that the movable part rotates together with said rotation shaft when said rotation shaft rotates around said rotation axis thereof relative to said first portion,
said first part has two projections projecting towards said second part, and arranged circumferentially of said rotation axis of said rotation shaft and spaced away from each other,
said second part has two projections projecting towards said first part, arranged circumferentially of said rotation axis of said rotation shaft and spaced away from each other,
said projections of said first part and said projections of said second part overlap each other axially of said rotation shaft when said first and second portions are open to each other at a certain angle in a range of predetermined angles,
said energizer energizes said movable part towards said fixed part, and
when said first and second portions are open to each other at a certain angle in the range of said predetermined angles, said first and second portions are kept open at said certain angle by virtue of frictional force generated between said projection of said fixed part and said projection of said movable part,
one of said two projections of said first part makes contact with one of said two projections of said second part, and the other of said two projections of said first part makes contact with the other of said two projections of said second part to provide frictional force for keeping said first and second portions open at said certain angle,
one of said two projections of said second part is comprised of an inner projection located radially inwardly around said rotation axis of said rotation shaft, and the other of said two projections of said second part is comprised of an outer projection located radially outwardly around said rotation axis of said rotation shaft.

10. The hinge as set forth in claim 9, wherein a first region in which said inner projection of said second part can move keeping contact with a surface of said first part facing said second part extends in 180 degrees or greater, and a second region in which said outer projection of said second part can move keeping contact with a surface of said first part facing said second part extends in 180 degrees or greater,
said first and second regions partially overlapping each other.

11. The hinge as set forth in claim 9, wherein an area which is located inwardly around said rotation axis of said rotation shaft and in which said inner projection can move keeping contact therewith extends in a greater angle than an angle in which an area which is located outwardly around said rotation axis of said rotation shaft extends, in a projection corresponding to said inner projection among said two projections of said first part, and
an area which is located outwardly around said rotation axis of said rotation shaft and in which said outer projection can move keeping contact therewith extends in a greater angle than an angle in which an area which is located inwardly around said rotation axis of said rotation shaft extends, in a projection corresponding to said outer projection among said two projections of said first part.

12. The hinge as set forth in claim 9, wherein said energizer is comprised of a resilient unit making contact with a surface of said movable part located oppositely to said fixed part, and a restrictor restricting said resilient unit to be compressed by said movable part to move far away from said fixed part.

13. The hinge as set forth in claim 12, wherein said resilient unit is comprised of a Belleville spring into which said rotation shaft is inserted between said restrictor and said movable part.

14. The hinge as set forth in claim 9, wherein said first part is formed at a surface thereof facing said second part with a lower-level portion lower than said projection of said first part, an upwardly-inclining portion upwardly inclining from said lower-level portion to said projection of said first part, and said projection of said first part, arranged in this order circumferentially of said rotation axis of said rotation shaft.

15. The hinge as set forth in claim 9, wherein said first part is formed at a surface thereof facing said second part with:
a first lower-level portion lower than a first projection which is one of two projections of said first part;
a first upwardly-inclining portion upwardly inclining from said first lower-level portion to said first projection;
said first projection;
a first downwardly-inclining or downwardly-stepped portion lowering from said first projection;
a second lower-level portion lower than a second projection which is the other of two projections of said second part;
a second upwardly-inclining portion upwardly inclining from said second lower-level portion to said second projection;
said second projection; and
a second downwardly-inclining or downwardly-stepped portion lowering from said second projection,
all arranged in this order circumferentially of said rotation axis of said rotation shaft.

16. The hinge as set forth in claim 9, wherein said projection of said first part and said projection of said second part are equal in height to each other.

17. The hinge as set forth in claim 15, wherein said first lower-level portion and said second lower-level portion are equal in height to each other.

18. A personal computer comprising a hinge according to claim 1.

19. A personal computer comprising a hinge according to claim 9.

* * * * *